United States Patent [19]

Kemmer

[11] 4,443,136
[45] Apr. 17, 1984

[54] MACHINE CUTTING TOOL

[75] Inventor: Klaus Kemmer, Wilberg, Fed. Rep. of Germany

[73] Assignee: ISCAR Hartmetall Gesellschaft mit beschrankter Haftung, Fed. Rep. of Germany

[21] Appl. No.: 438,885

[22] PCT Filed: Feb. 19, 1982

[86] PCT No.: PCT/DE82/00033
§ 371 Date: Oct. 19, 1982
§ 102(e) Date: Oct. 19, 1982

[87] PCT Pub. No.: WO82/02845
PCT Pub. Date: Sep. 2, 1982

[30] Foreign Application Priority Data

Feb. 19, 1982 [DE] Fed. Rep. of Germany ....... 3106120

[51] Int. Cl.³ .............................................. B26D 1/00
[52] U.S. Cl. ...................................... 407/72; 407/50; 407/110; 407/117; 407/90; 83/839; 83/845
[58] Field of Search .................... 407/72, 50, 110, 66, 407/90, 95, 102, 117; 83/839, 842, 845; 279/1 T, 1 B, 102

[56] References Cited

U.S. PATENT DOCUMENTS

| | | | |
|---|---|---|---|
| 80,929 | 11/1868 | Disston | 83/845 |
| 488,336 | 12/1892 | Kendall | 83/845 |
| 744,228 | 11/1903 | Peelle | 407/90 |
| 3,785,021 | 1/1974 | Norgren | 407/117 |

FOREIGN PATENT DOCUMENTS

| | | | |
|---|---|---|---|
| 701900 | 1/1931 | France | 407/66 |
| 1214799 | 11/1959 | France | 407/90 |
| 162940 | 10/1964 | U.S.S.R. | 83/839 |

Primary Examiner—Leonidas Vlachos
Attorney, Agent, or Firm—Ladas & Parry

[57] ABSTRACT

A machine cutting tool comprising a holder into which replaceable cutting inserts may be inserted in a self-gripping manner. The holder and cuttng inserts each have two contact surfaces opposite each other of an approximate circular form about the center of rotation of the cuttng insert. When in working position, the contact surfaces are developed complementary to one another and provided with guides. The cutting insert can be inserted into the holder with its narrow side and can be securely locked by turning it in the direction of the force acting on the cutting edge during operation. A detachment of the cutting insert during operation is impossible. The cutting insert preferably has two diametrically opposite cutting edges.

11 Claims, 8 Drawing Figures

MACHINE CUTTING TOOL

TECHNICAL FIELD OF THE INVENTION

The invention relates to a machine cutting tool which comprises replaceable cutting inserts and a holder for a self-gripping attachment of the cutting inserts.

Prior Art

Cutting tools of this kind are known, for example, from German Utility Pat. No. 70 07 326. They have two seat jaws opposite each other, comprising contact surfaces which are formed complementary to opposite, when in working position, contact surfaces of a cutting insert and convex or concave guide means within the contact surfaces. The holders of these known tools are wedge-shaped. These cutting tools, however, have the disadvantage that the cutting insert is often not firmly enough seated so that when the tool is used for cutting in or cutting off, the workpiece can be damaged if the cutting insert falls out. Furthermore, it has already occured that the cutting insert was pulled out while the cutting tool was reversing. It is easily imaginable that this may lead to heavy damages of the workpieces as well as of the turning lathes, turning machines, and high-capacity numerically controlled (N/C) automatic machines which are preferably used for these tools.

Characteristics of the Invention

It is the object of the invention to produce a cutting tool comprising replaceable cutting inserts in which a self-locking, secure seat is guaranteed in any case, i.e., in which a cutting insert cannot be taken out from a holder without a special tool of the simplest kind. This object is achieved in that the cutting insert is insertable into the holder by turning it in the direction of the forces acting on the cutting edge about an axis parallel to the cutting edge, the contact surfaces having the shape of an approximate circular arc about the center of rotation of the cutting insert whose distance from the center of rotation of the cutting insert whose distance from the center of rotation decreases in the direction of turning as well as an insert groove in the depth of the holder between the contact surfaces, and a flat segment at the cutting insert which is adjacent to the contact surfaces.

Further developments of the invention are understandable in particular from the dependent claims.

BRIEF DESCRIPTION OF THE DRAWINGS

The invention is now described in detail by means of practical examples in association with the accompanying drawings in which.

GENERAL DESCRIPTION OF THE INVENTION

Figure 1:
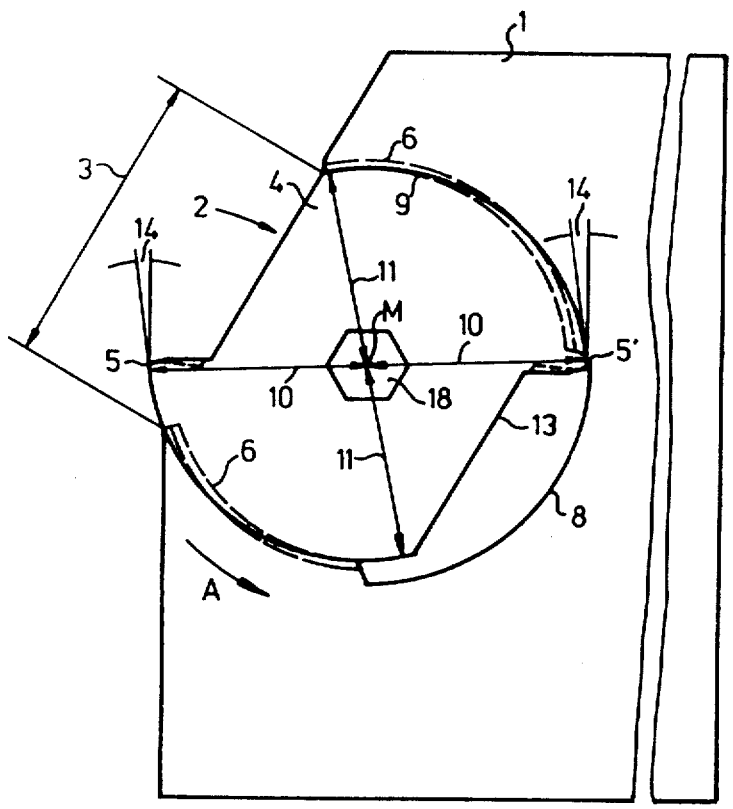
FIG. 1 is a side elevation of the cutting tool according to the invention.
Figure 3:
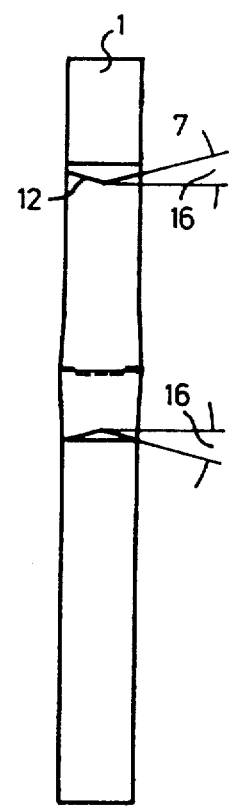
FIG. 3 is a front elevation.
Figure 2:
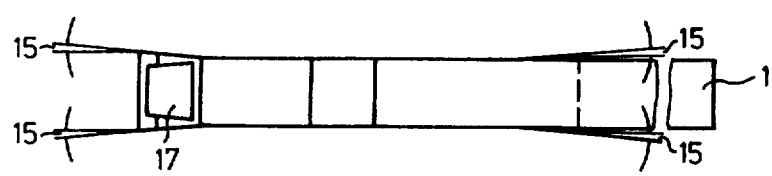
FIG. 2 is a top view.

FIGS. 1, 2 and 3 show a cutting tool 1 comprising a holder 2 adapted for the insertion of a cutting insert, the width of the opening 3 of the holder being indicated by an arrow which is not numbered.

A cutting insert 4 is inserted into the holder 2, the cutting insert 4 having one, but preferably two cutting edges 5 and 5'. The position shown here is a working position. The cutting insert is inserted into the holder 2 with its "narrow side". In other words, the diameter of the cutting insert obliquely to the narrow side is larger than the width of opening 3 of holder 2.

Holder 2 has two seat jaws opposite each other, comprising contact surfaces 6 of the form of an approximate circular arc about the center of rotation M of the cutting insert 4 whose distance 10, 11 from the center of rotation M decreases in the direction of turning the cutting insert (see arrow A). The contact surfaces 6 include negative or positive guide means which serve for integrating complementary guide means into contact surfaces 9 of the cutting insert. When the guides are guide grooves, the contact surfaces 9 of the cutting insert have guide tongues, which are complementary thereto. These guide grooves or guide tongues may have any cross-sections complementary to one another. These cross-sections, for example, can be triangular, rectangular, semicircular, symmetrical or unsymmetrical.

The cutting insert 4 also has two contact surfaces 9 of an approximate circular form about the center of rotation M, which when in working position are formed complementary to the contact surfaces 6 of the holder. In the case of cutting inserts 4, the distance of the contact surfaces 9 also decreases from the center of rotation M in the direction of turning, starting when being adjacent to cutting edge 5, i.e., the horizontal distance 10 of the contact surface from the center of rotation M is greater than the downward distance 11.

Figure 4:
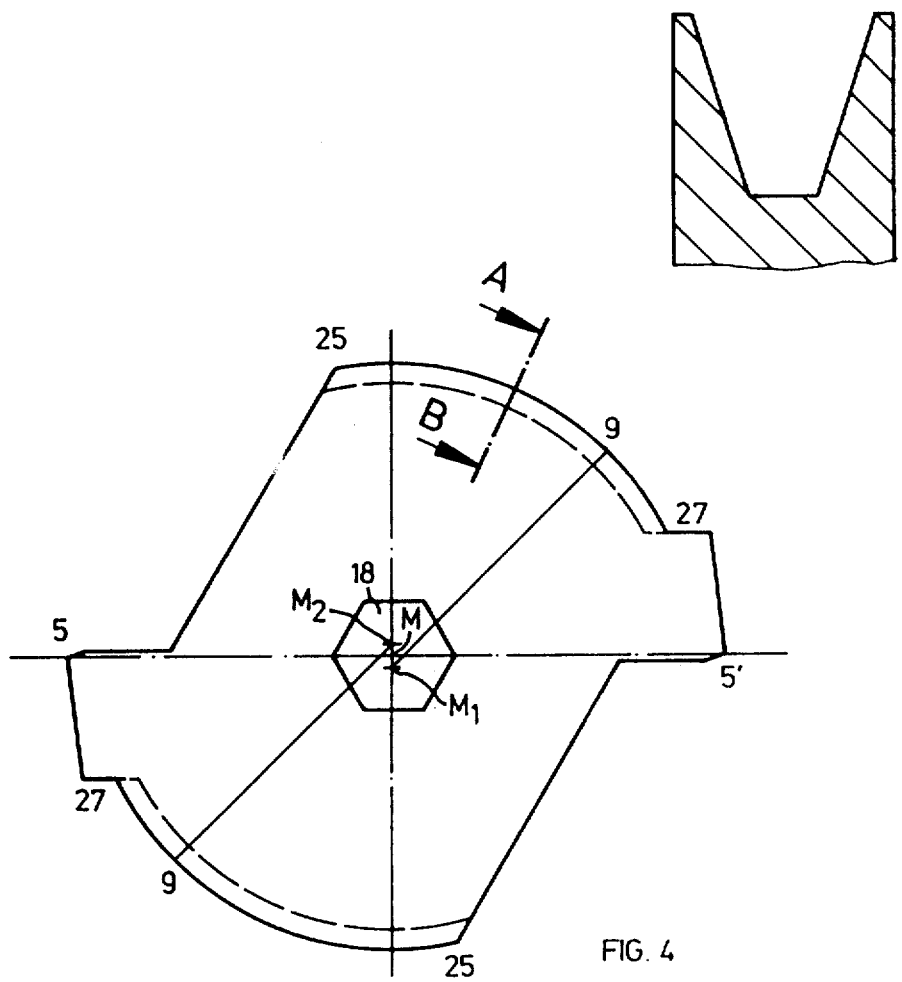
FIGS. 4 and 5 show a somewhat modified cutting insert and a relevant thereto holder on an enlarged scale.
Figure 5:
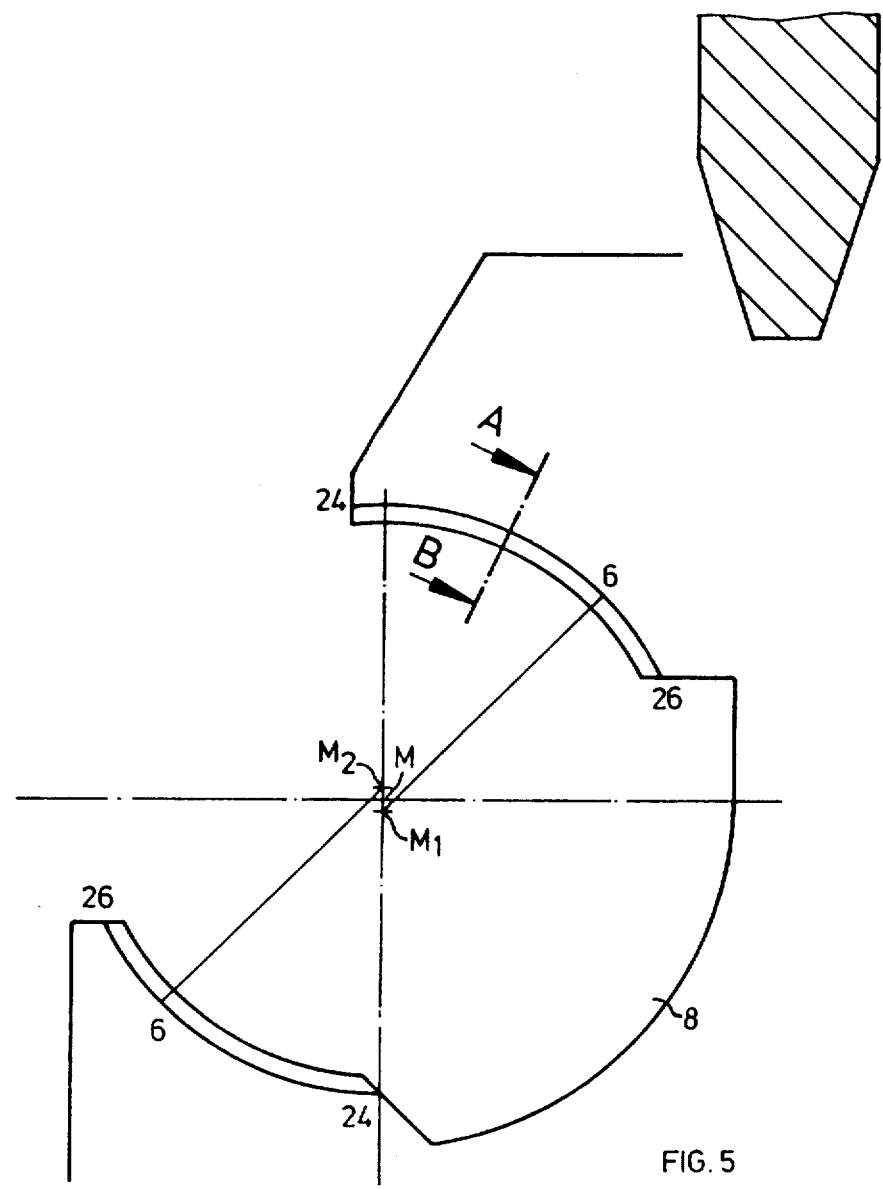

Contact surfaces 8 of the seat jaws and, accordingly, contact surfaces 9 of the cutting inserts can also have the form of two eccentric circular arcs whose centers $M_1$ and $M_2$ seen respectively from the end 24 or 25 of the contact surface-lie behind the center of rotation M of the cutting insert (See FIGS. 4 and 5). The distance of the eccentric centers $M_1$ and $M_2$ from the center of rotation M corresponds precisely to the difference between the horizontal distance 10, between the center of rotation M and the contact surfaces, and the vertical distance 11 between the center of rotation M and the contact surfaces.

Owing to this manner of development of the cutting inserts, on the one hand, and the guides arranged in the holders, on the other hand, there results a wedge-shaped slot between both the members after inserting the cutting insert into the holder. By turning cutting insert 4 counterclockwise, cutting insert 4 wedges in the holder 2, and the forces, which act upon cutting edge 5 during operation, always effect a locking of the cutting insert 4 and never a detachment thereof.

Furthermore, FIGS. 1 and 3 show a positive guide tongue 7 and a negative guide groove 12, and a flat segment 13 which, being stepped off (graded off), borders on a cutting edge 5,5'. Further FIG. 1 shows a front clearance angle 14. FIG. 2 shows a back-slope angle 15 of the cutting insert, and FIG. 3 shows an angle 16 of the guide tongue or guide groove when it, as shown in the practical example, has a triangular cross-section. Further FIG. 2 shows a synclinal depression 17 in the in the face of the cutting insert somewhat behind the cutting edge 5; this depression serves for shaping by cutting.

An end stop 26 is provided at the holder 2 before the onset of at least one contact surface 6; a corresponding end stop 27 of the cutting insert, which is located behind the cutting edge 5 at the onset of at least one contact surface 9, butts against end end stop 26.

Figure 6:
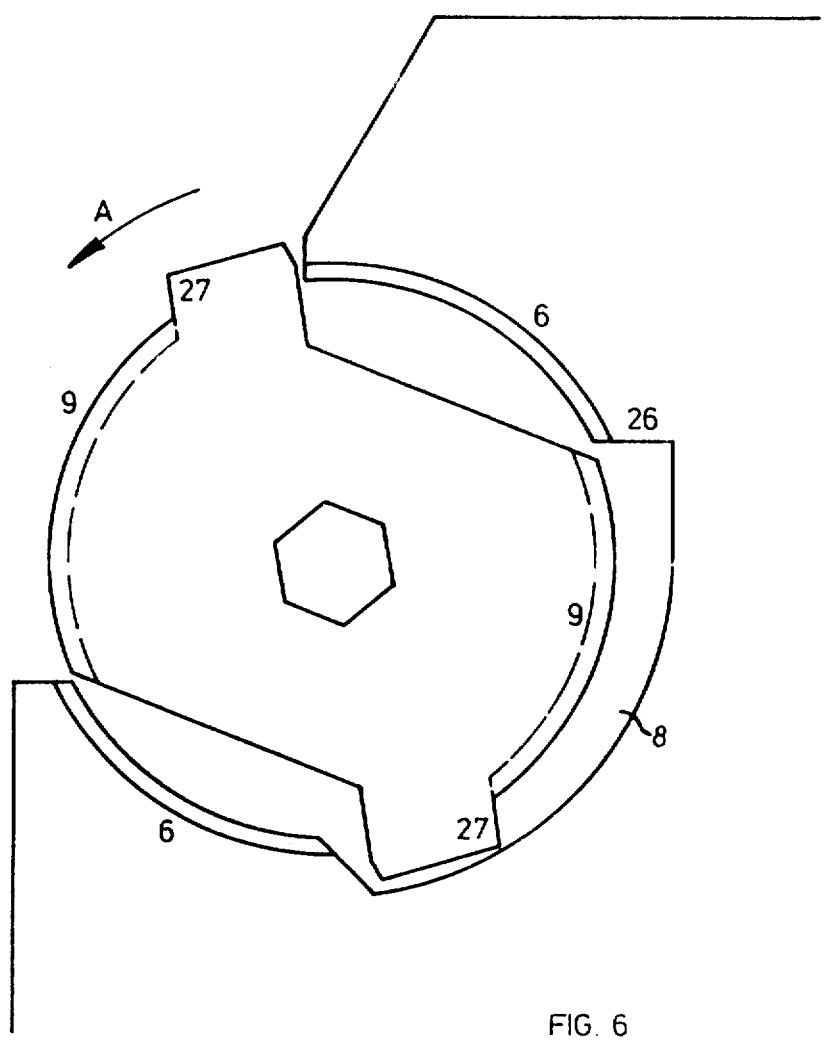
FIG. 6 shows the insertion of a cutting insert into a storage bin.
Figure 7:
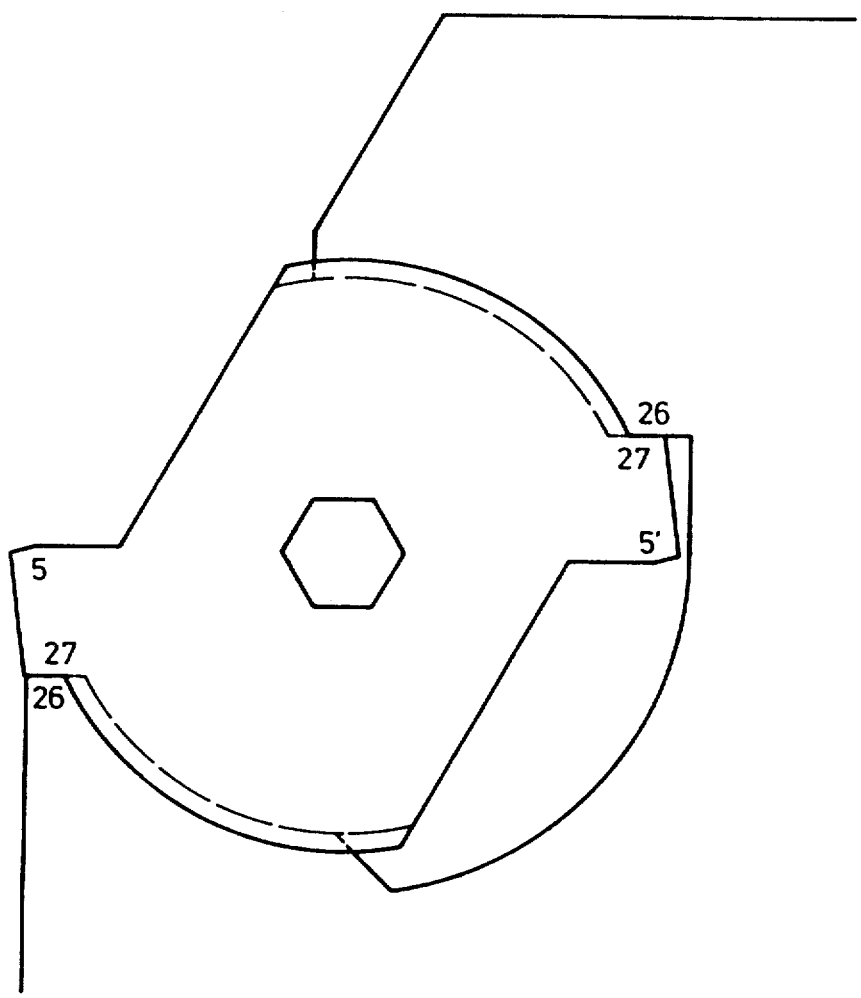
FIG. 7 shows a cutting insert in working position.

Insert groove 8 is located between contact surfaces 6 in the depth of holder 2. Owing to that the cutting insert can be introduced deeply enough into the storage bin with its narrow side when being mounted, as shown in FIG. 6.

Figure 8:
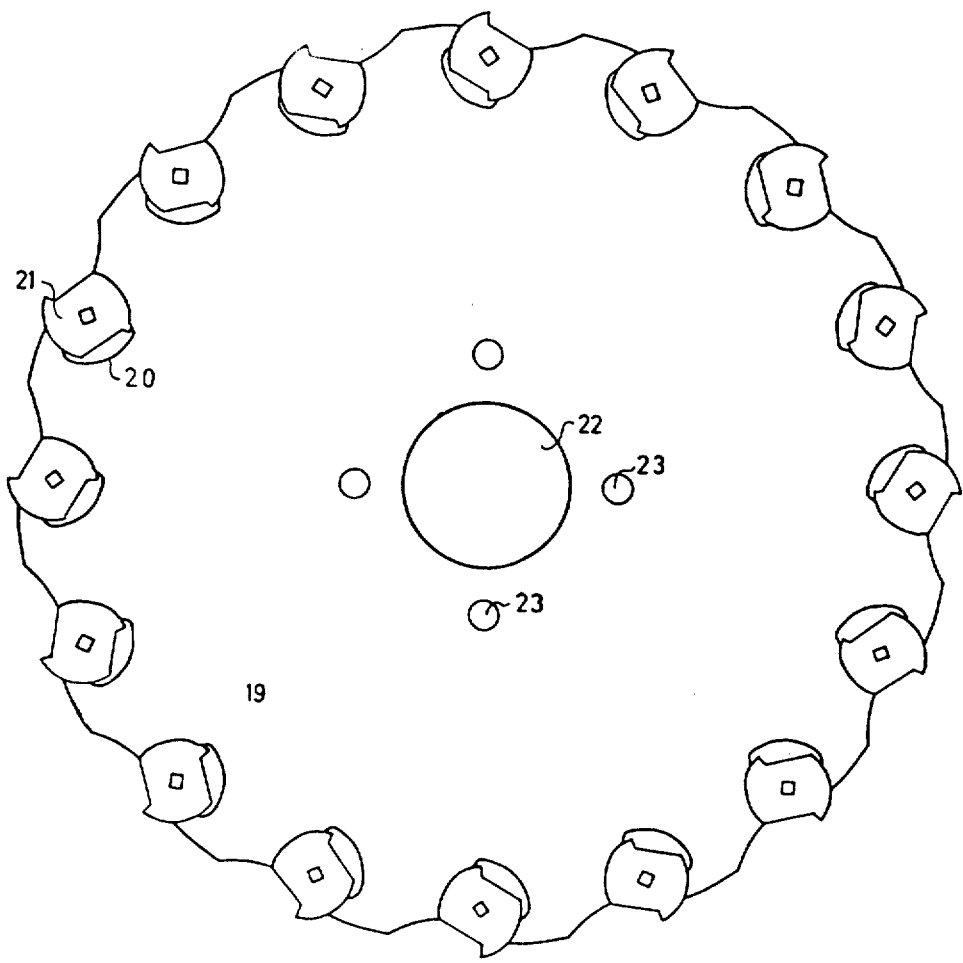
FIG. 8 shows a further embodiment of the invention on the basis on an example of use.

For mounting, the cutting insert has, for example, a hexahedral bore 18, which is concentric with the center of rotation M so that a hexahedral wrench may be used for inserting or removing the cutting plate. FIG. 8 shows a further example for using the cutting tool according to the invention by way of a side-milling cutter 19. This side-milling cutter 19 has along its periphery a plurality of holders 20, constructed according to the invention, which are inserted into the same number of cutting inserts 21. The side-milling cutter 19 has a center bore 22 and mounting bores 23.

The cutting tool according to the present invention has many advantages. Since the cutting insert is preferably provided with two cutting edges, the cutting insert can be removed after wear of one cutting edge, turned by 180°, inserted anew and further used. The cutting insert cannot fall out, which is especially important in so-called overhead work. A cutting tool comprising the novel cutting insert is also especially suitable for rotating tools such as side-milling cutters and saws. Moreover, the cutting insert cannot be removed during the reverse running of the carriage. The large, circular guide surfaces ensure a great rigidity of the operative connection between cutting insert and storage bin, due to which there takes place a very small deviation of the cutting insert during cutting off and application of the tool.

It is very essential for the novel cutting tool that no auxiliary jigs such as clamps, bolts, tension pins, springs and such like are required. Also, when utilized in side-milling cutters, the cutting insert is kept in its terminal seat only by centrifugal force under no-load condition. The forces acting on the cutting edges act in the same direction.

Thus, by means of the invention there has been produced a novel cutting tool which has considerable advantages over the hitherto known cutting tools for N/C-machines, rotary automatic machines, multi-spindle automatic bar machines, milling and sawing machines.

Although the principles of the invention have only been described by means of special arrangements, it must be maintained that they serve as examples and should not limit the scope of the invention.

I claim:

1. A machine cutting tool comprising replaceable cutting inserts (4) and a holder (2) for a self-gripping attachment of said cutting insert (4), two seat jaws opposite each other, contact surfaces (6) which are formed complementary to opposite when in working position, contact surfaces (9) of said cutting insert (4), and convex or concave guide means (7), (12) in the contact surfaces, characterized in that said cutting insert is insertable into said holder (2) by being turned about an axis M parallel to a cutting edge (5) in the direction of the forces acting on said cutting edge (5), the contact surfaces (6) have the shape of an approximate circular arc about the center of rotation M of said cutting insert (4) whose distance (10,11) from the center of rotation decreases in the direction of turning, and there is provided an insert groove (8) in the depth of said holder (2) between said contact surfaces (6) and a flat segment (13) at the cutting insert (4) which is adjacent to said contact surfaces (9).

2. A cutting tool according to claim 1, characterized in that said contact surfaces (9) of the seat jaws have the form of eccentric circular arcs whose centers $M_1, M_2$, seen respectively from the end (24) of the arc, lie behind the center of rotation M of said cutting insert (4).

3. A cutting tool according to claim 2, characterized in that an end stop (26) is provided at said holder (2) before the onset of at least one contact surface (6).

4. A cutting tool according to claim 3, characterized in that the convex guide means are guide tongues and the concave guide means are guide grooves having a triangular, rectangular, semicircular, symmetrical or unsymmetrical cross-section.

5. A cutting tool according to claim 4, characterized in that at the periphery of a disc (19) there is arranged a plurality of holders (20) for cutting inserts (21), and that all these cutting inserts (21) are fastenable by being turned in the direction of the force acting on the cutting edge (5) during operation, and are detachable by being turned in counter-direction.

6. A cutting insert for cutting tools according to claim 5, comprising at least one cutting edge (5) and two contact surfaces (9) opposite each other, which are formed complementary to opposite, when in working position, contact surfaces (6) of said holder (2), and convex or concave guide means in the contact surfaces, characterized in that said contact surfaces (9) have the form of an approximate circular arc about the center of rotation M of said cutting insert whose distance (10,11) from the center of rotation M decreases, starting at a cutting edge (5), and there is a flat segment (13) adjacent to said contact surfaces (9).

7. A cutting insert according to claim 6, characterized in that said contact surfaces (9) have the form of two eccentric circular arcs whose centers $M_1$ $M_2$, seen from the end (25) of said contact surface (9), lie behind the center of rotation M of said cutting insert.

8. A cutting insert according to claim 7, characterized by an end stop (27) at the onset of said contact surfaces (9).

9. A cutting insert according to claim 8, characterized in that the convex or concave guide means of said contact surfaces (9) are such that their cross-section is triangular, rectangular, semicircular, symmetrical or unsymmetrical.

10. A cutting insert according to claim 9, characterized by a polygonal bore (18), which is concentric to the axis of rotation M.

11. A cutting insert according to claim 10, characterized by two cutting edges (5), (5') at the onset of a contact surface (9), a flat segment (13) being attached to each of said cutting edges.

* * * * *